US011568090B2

(12) United States Patent
Nouard

(10) Patent No.: US 11,568,090 B2
(45) Date of Patent: Jan. 31, 2023

(54) DIGITAL SIGNATURES FOR ANALYTICS

(71) Applicant: Business Objects Software Ltd., Dublin (IE)

(72) Inventor: Arnaud Nouard, D'Huison-Longueville (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

(21) Appl. No.: 17/321,955

(22) Filed: May 17, 2021

(65) Prior Publication Data

US 2022/0366086 A1 Nov. 17, 2022

(51) Int. Cl.
| G06F 21/64 | (2013.01) |
| G06F 21/44 | (2013.01) |
| G06F 3/04842 | (2022.01) |
| G06F 3/04845 | (2022.01) |
| G06F 21/31 | (2013.01) |

(52) U.S. Cl.
CPC .......... *G06F 21/64* (2013.01); *G06F 3/04842* (2013.01); *G06F 3/04845* (2013.01); *G06F 21/31* (2013.01); *G06F 21/44* (2013.01)

(58) Field of Classification Search
CPC .. G06F 21/64; G06F 3/04842; G06F 3/04845; G06F 21/31; G06F 21/44
See application file for complete search history.

(56) References Cited

U.S. PATENT DOCUMENTS

| 8,086,635 | B1 * | 12/2011 | Rinker | G06F 21/604 |
| | | | | 707/783 |
| 2007/0101146 | A1 * | 5/2007 | Louch | H04L 63/10 |
| | | | | 713/176 |
| 2017/0148241 | A1 * | 5/2017 | Kerning | H04W 4/026 |
| 2017/0357828 | A1 * | 12/2017 | Phillips | G06F 16/00 |
| 2018/0184250 | A1 * | 6/2018 | Barrett | G06F 21/10 |
| 2020/0014816 | A1 * | 1/2020 | Speasl | H04N 1/00129 |
| 2021/0312561 | A1 * | 10/2021 | Speasl | H04L 63/123 |

\* cited by examiner

*Primary Examiner* — Beau D Spratt
(74) *Attorney, Agent, or Firm* — Buckley, Maschoff & Talwalkar LLC

(57) ABSTRACT

Computer-readable media, methods, and systems are disclosed for displaying a visual indication that an analytics rendering is authentic, and the integrity of the data is accurate and trusted. An analytics rendering comprising at least one table, chart, or graphic rendered from a plurality of aggregated data inputs from a plurality of microsystems may be selected. In a user interface for the analytics rendering, one or more structural identifiers associated with each data input of the plurality of aggregated data inputs can be displayed. A data input from the plurality of data inputs can then be selected and, responsive to receiving an instruction from a user, a visual indicator can be applied to the data input. If the one or more data inputs having an applied visual indicator is modified, the visual indicator will be visually altered in response the modification to the one or more data inputs.

20 Claims, 8 Drawing Sheets

DIGITAL SIGNATURES FOR ANALYTICS

TECHNICAL FIELD

The current subject matter is directed to digital signatures, and in particular to systems and methods for authenticating the accuracy and integrity of digital analytics.

For some online analytics documents, visual indicators, such as digital signatures, provide important tools to ensure that a particular analytics rendering has been reviewed, that the analytics rendering is authentic, and that the analytics rendering contains accurate information. Existing methods for providing a digital signature on an analytics rendering can authenticate static contents of the analytics rendering. However, existing digital signatures either lock the static contents of the analytics rendering, or the digital signatures are applied only after the document has reached a point where no further revisions can be made. In static analytics renderings that are no longer being modified, a static signature or other visual indicator can indicate that the document is authentic and the contents within are accurate. However, such static visual indicators are inadequate for use in connection with dynamic analytics documents, such as business intelligence documents, in which the integrity of the analytics rendering would ideally be validated even when underlying date changes as reflected in rendered graphs, charts, tables and infographics displaying the data of the dynamic analytics document (i.e., values, numbers displayed in a format similar to a Microsoft Word, Microsoft Excel, or .pdf). Dynamic analytics documents are constantly updating, changing, being integrated, or being de-integrated from underlying data.

Accordingly, a need exists for an authentication method that can be applied to an analytics document, allowing authentication of dynamic data, while still allowing aspects of the analytics to be modified while maintaining authenticity and without breaking the visual indicator or digital signature.

SUMMARY

Disclosed embodiments address such problems by providing or more non-transitory computer-readable media storing computer-executable instructions that, when executed by a processor, perform a method for applying a digital signature to an analytical rendering providing a visual indication that the analytics rendering is valid, the method comprising: retrieving, based upon a selection by a user, an analytics report comprising at least one analytics rendering component rendered from a plurality of aggregated data inputs from a plurality of data sources; displaying, in a user interface for the analytics report, one or more structural identifiers associated with each data input of the plurality of aggregated data inputs; retrieving, based upon a selection by a user, one or more data inputs from the plurality of aggregated data inputs; responsive to receiving an instruction from a user, applying a visual indicator to the selected data inputs, wherein the visual indicator provides a visual confirmation of an authenticity of the selected data inputs; and displaying the visual indicator to the user in the user interface, wherein the visual confirmation of the authenticity of the selected data inputs is based on a digital signature applied to metadata associated with the one or more data inputs.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
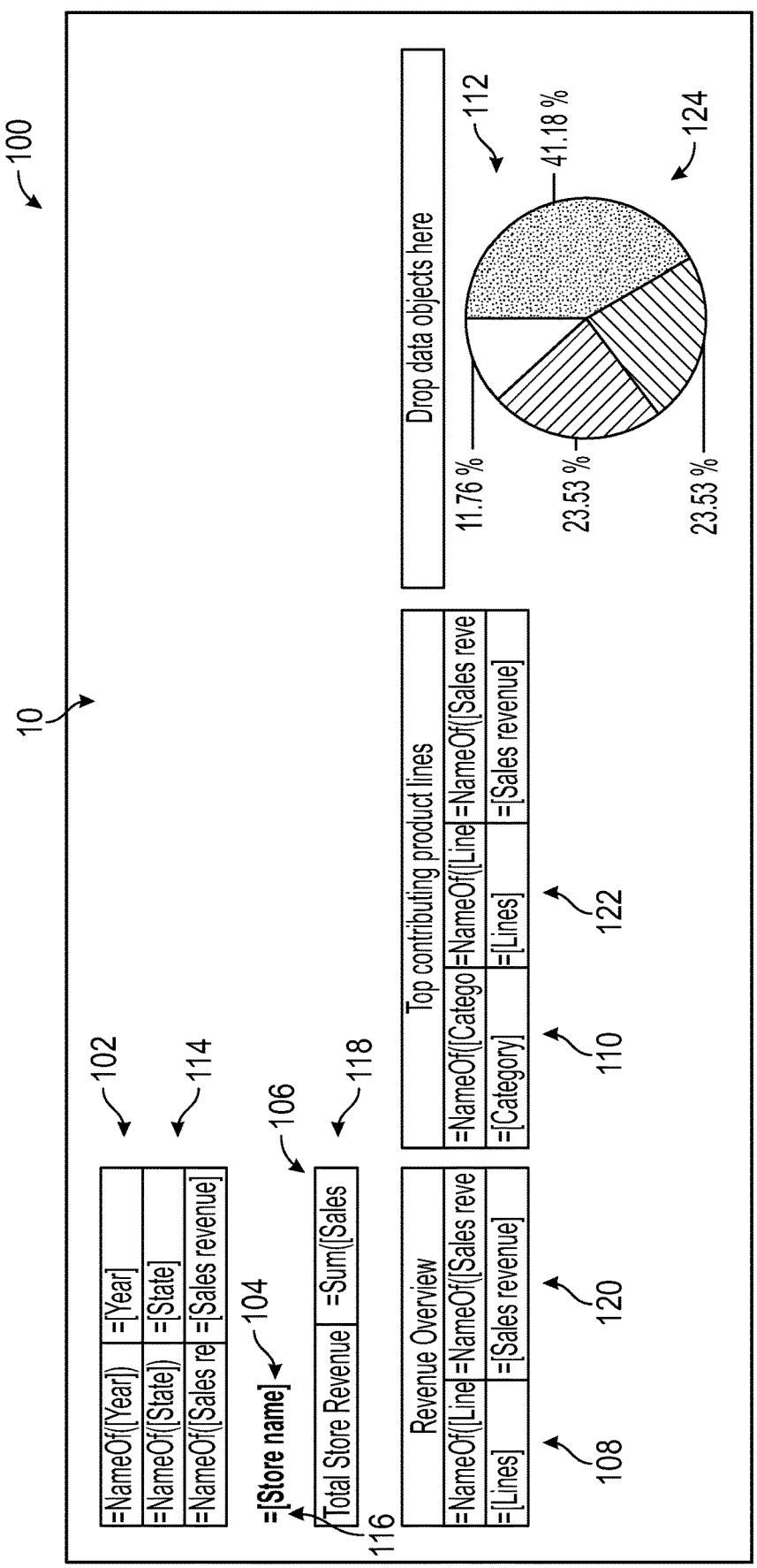
FIG. 1 depicts an exemplary design-time of an analytics rendering for certain embodiments.

The drawing figures do not limit the present teachings to the specific embodiments disclosed and described herein. The drawings are not necessarily to scale, emphasis instead being placed upon clearly illustrating principles of the present teachings.

DETAILED DESCRIPTION

In some embodiments, a visual indicator, such as a digital signature, electronic signature, or other indication of authenticity, integrity or validity can be applied to an analytics rendering, such as business intelligence or analytics documents, analytics renderings such as dashboards, charts, or reports, or other commonly known analytics. Analytics renderings are well known in the art, and can comprise at least one analytics report, the analytics reports comprising analytics rendering components, such as tables, charts, graphs, infographics, or other graphics. In these types of analytics reports, the integrity of the analytics rendering is not linked to the finally rendered and displayed data (i.e., values, numbers displayed in a format similar to a Microsoft Word, Microsoft Excel, or portable document format (.pdf)), and instead, the integrity of the analytics rendering is linked to data inputs from data sources that may be constantly updating, changing, integrated, or de-integrated from the analytics rendering. The visual indicator can provide a visual representation to an end-user, developer, or other user that the integrity of the analytics rendering has been reviewed, is trusted, and is authentic. A visual indicator is particularly advantageous for analytics renderings, because an end-user can still interact with the visualizations of the analytics rendering, navigate through the analytics rendering, change the layout of the analytics rendering, or other visual or stylistic portions of the analytics rendering, without affecting the source of the data. In the event that a user modifies a data input, data source, or the structure of the analytics rendering that the visual indicator has been applied to, the visual indicator may break, or otherwise provide a secondary visual indicator that the analytics rendering is no longer authentic.

As used herein, references to a user interface displaying an analytics rendering are made. The user interface displaying the analytics rendering may be displayed in various different applications, programs, and formats. For example, in some embodiments, the user interface may be implemented using one or more different user interface (UI) frameworks. In some embodiments, the user interface may be implemented in a dedicated software format, such as for example, Microsoft Excel or in a .pdf format. The implementation of the user interface is not intended to be a limiting feature of the present disclosure, and embodiments may be formatted in accordance with any known or yet to be discovered UI frameworks.

The subject matter of the present disclosure is described in detail below to meet statutory requirements; however, the description itself is not intended to limit the scope of the claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention(s) in sufficient detail to enable those skilled in the art to practice the invention(s). Other embodiments can be utilized, and changes can be made without departing from the claimed scope. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Turning now to the drawings, embodiments of the disclosure comprise a system, method, and non-transitory computer readable media for applying a visual indicator to an analytics rendering, in which the visual indicator provides to a user verification that the contents of the analytics rendering are valid and the integrity of the analytics rendering is accurate.

FIG. 1 illustrates an exemplary embodiment of an analytics rendering and is depicted and referred to generally by reference numeral 10. In some embodiments, analytics rendering 10 may comprise any known analytics rendering as defined above, or any other known analytics rendering for analytics and ad hoc reporting of business intelligence. For example, analytics rendering 10 may be constructed from transactional data in databases and built using any analytics tool known in the field. In some embodiments, analytics rendering 10 may comprise at least one analytics report in the form of tables, charts, graphs, infographics, or other graphics created from aggregated data inputs from a plurality of data sources or databases. For example, the aggregated data may comprise spreadsheet files, relational or non-relational database tables or other database data sources, business warehouse data sources, or other known sources of data for business intelligence and analytics documents. The aggregated data may be selected by a user for building the final design and layout of analytics rendering 10, depending on the final requirements and desired reporting purpose of analytics rendering 10.

FIG. 1 depicts an exemplary embodiment of analytics rendering 10 displayed in a user interface further depicting the design time of analytics rendering 10 depicted as reference numeral 100. FIG. 1 further displays the skeleton or structure of analytics rendering 10 in user interface 100. In some embodiments, only trusted users or users having pre-approved credentials or authority may have access to user interface 100 displaying the design time of analytics rendering 10. In other words, in some embodiments an end-user lacking credentials or pre-approval will not be able to access user interface 100 displaying the design time of analytics rendering 10. By limiting the number of potential users that can access user interface 100 and therefore the design time of analytics rendering 10, the integrity of analytics rendering 10 can have an additional level of trust for end-users that the contents of analytics rendering 10 is authentic, valid, and trusted.

FIG. 1 further depicts exemplary embodiments the plurality of analytics reports used to create analytics rendering 10, and the plurality of analytics reports are depicted and referred to generally by reference numerals 102, 104, 106, 108, 110 and 112. As described above, the analytics reports may further comprise at least one analytics rendering component rendered from a plurality of aggregated data inputs from a plurality of data sources. As further depicted in FIG. 1, the design time of analytics rendering 10 depicts the skeleton or structural identifiers of each of analytics reports 102, 104, 106, 108, 110, and 112, providing a visual representation of the formula, sources, calculations, and other analytical information directed to the structure of the plurality of data inputs comprising the analytics reports that further comprise analytics rendering 10. As further depicted in FIG. 1, the structural identifiers of each of the plurality of analytics reports are depicted and referred to by reference numerals 114, 116, 118, 120, 122, and 124. The structural identifiers may further provide the structural information of the plurality of aggregated data inputs from the plurality of data sources. In some embodiments each of the structural identifiers 114, 116, 118, 120, 122, and 124 may be individually created through the selection data inputs rendered from a plurality of aggregated data inputs from a plurality of data sources in communication with analytics rendering 10. In some embodiments, analytics rendering 10 may comprise any number of structural identifiers corresponding to the number of data inputs.

As described in greater detail below, in some embodiments a user with access to the design time of analytics rendering 10 displayed in user interface 100 may be able to apply a visual indictor (not shown) to one or more of the structural identifiers of the plurality of analytics reports of analytics rendering 10. For example, after reviewing the structural identifiers of at least one of the reports and confirming that the data from the data source or database is accurate and authentic, the user may then apply a visual indicator on at least one of the structural identifiers, providing a visual indication that the data is authentic and can be trusted. In some embodiments, the visual indicator may be designed as a digital signature, electronic signature, text, graphic, or any other rendered object that conveys analytical or diagnostic information to a user. In some embodiments, the visual indicator may further contain metadata associated with the user that applied the visual indicator, providing information for future users about the author of the visual indicator. The visual indicator may further comprise other diagnostic information, such as for example a timestamp, geolocation, Internet Protocol (IP) address of the user, or other metadata or analytical information associated with the user. In some embodiments comprising a plurality of analytics reports, a visual indicator may be applied to each structural identifier associated with each of the plurality data inputs comprising the plurality of analytics reports, analogous to a tree-diagram. For example, in the exemplary embodiment displayed in FIG. 1, a visual indicator may be applied to structural identifiers 114, 116, 118, 120, 122, and 124, or any combination thereof, wherein each of the structural identifiers can act as a branch in the tree-diagram, and each branch can comprise a distinct or separate visual indicator. In exemplary embodiments, the structural identifiers of analytics rendering 10 may further comprise sub-parts or an otherwise hierarchal structure to the structural identifiers. In these exemplary embodiments, visual indicators can further be placed on the specific sub-part of the structural identifiers, in addition or in place of a visual indicator applied to the structural identifier as a whole.

In some embodiments, the design time of analytics rendering 10 may be accessible by multiple users, wherein each of the user may have pre-approved credentials allowing the user to both view and modify analytics rendering 10 and create analytics reports from the plurality of data inputs. In some embodiments, a user may have credentials to modify only certain analytics reports, i.e., less then all of the analytics reports within analytics rendering 10. For example, in the exemplary embodiment described in FIG. 1, a user may only have credentials to modify and/or apply a visual indicator to structural identifiers 114, 116, and 118, but the user does not have the credentials to modify and/or apply a visual indicator to structural identifiers 120, 122, and 124. Additionally, a second user may have credentials or authorization to modify and/or apply a visual indicator to structural identifier 120, 122, and 124. In some exemplary embodiments, users having credentials or approval to access the design time of analytics rendering 10 can further view the visual indicators applied to the structural identifiers, including the associated metadata associated with the visual indicators or users.

Figure 2:
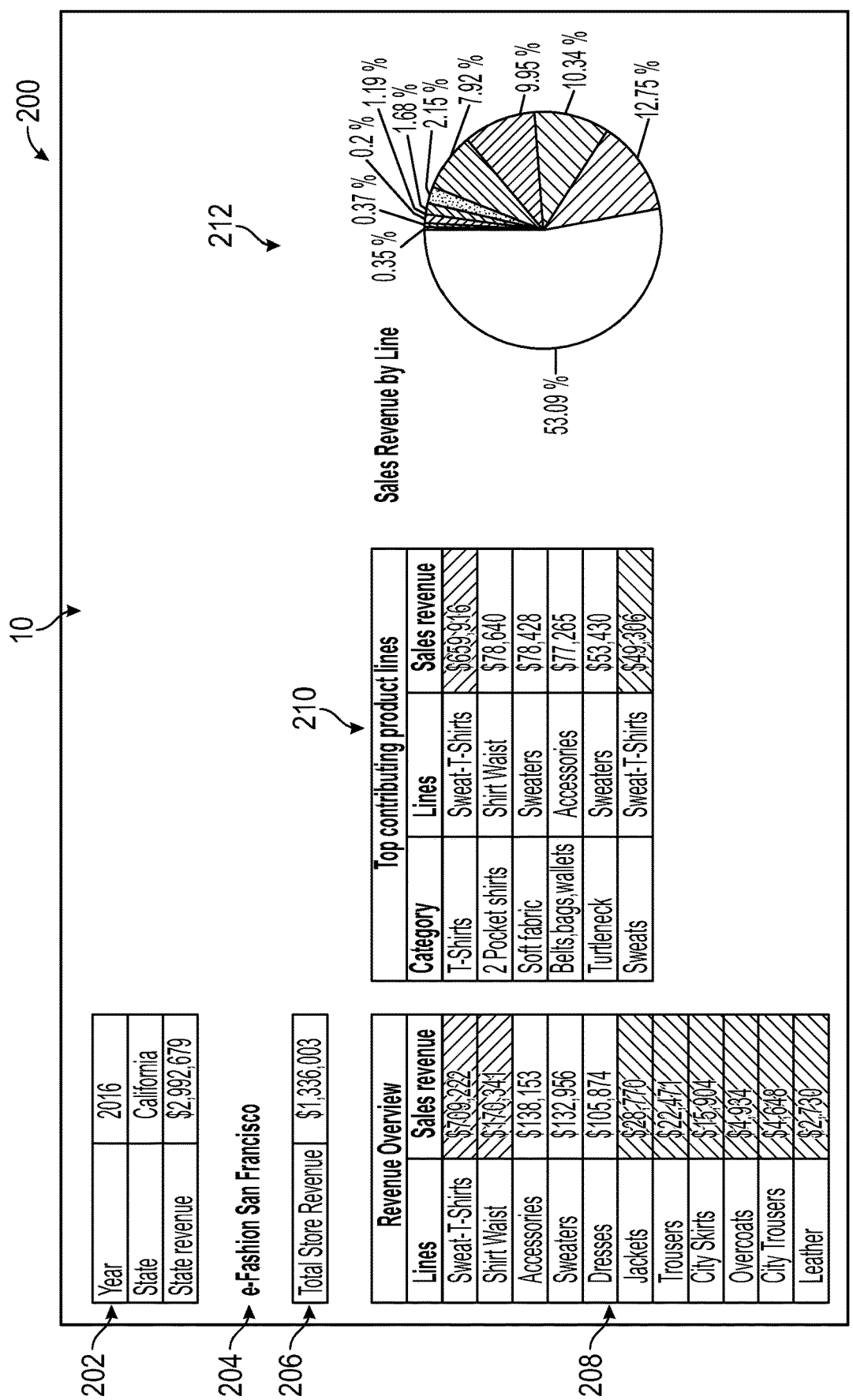
FIG. 2 depicts an exemplary run-time of an analytics rendering for certain embodiments.

FIG. 2 depicts a user interface of the exemplary embodiment of analytics rendering 10 as depicted in FIG. 1, displaying the run time of analytics rendering 10 and generally depicted and referred to as reference numeral 200. As depicted in FIG. 2, user interface 200 can display to a user the rendered analytics reports of the data inputs and structural identifiers depicted in the design time of FIG. 1. In some embodiments, an end-user, or users lacking certain credentials or approval, may only have access to the run time of analytics rendering 10 and will not have access to the design time of analytics rendering 10.

As depicted in FIG. 2, the structural identifiers of the data inputs of reports are not visible to a user in user interface 200 displaying the run time of analytics rendering 10. Instead, the finally rendered analytics reports are displayed containing analytics rendering components, which may be rendered as charts, tables, graphs, infographics, or graphics of reports or data inputs will be displayed to the user, without displaying the structure, skeleton, or structural identifiers visible in the design time of analytics rendering 10. For example, in the exemplary embodiment of analytics rendering 10 displayed in user interface 200, analytics reports are depicted and referred to as reference numerals 202, 204, 206, 208, 210, and 212 respectively. In the exemplary embodiment of analytics rendering 10 depicted in FIG. 2, report 102 of FIG. 1 is depicted as rendered table 202; report 104 of FIG. 1 is depicted as rendered graphic 204; report 106 of FIG. 1 is depicted as rendered table 206; report 108 of FIG. 1 is depicted as rendered table 208; report 110 of FIG. 1 is depicted as 210; and report 112 of FIG. 1 is depicted as rendered graph 212. It will be appreciated that the analytics reports displayed in user interface 200 may be rendered or comprise any analytics rendering component, as chosen by a user.

Figure 3:
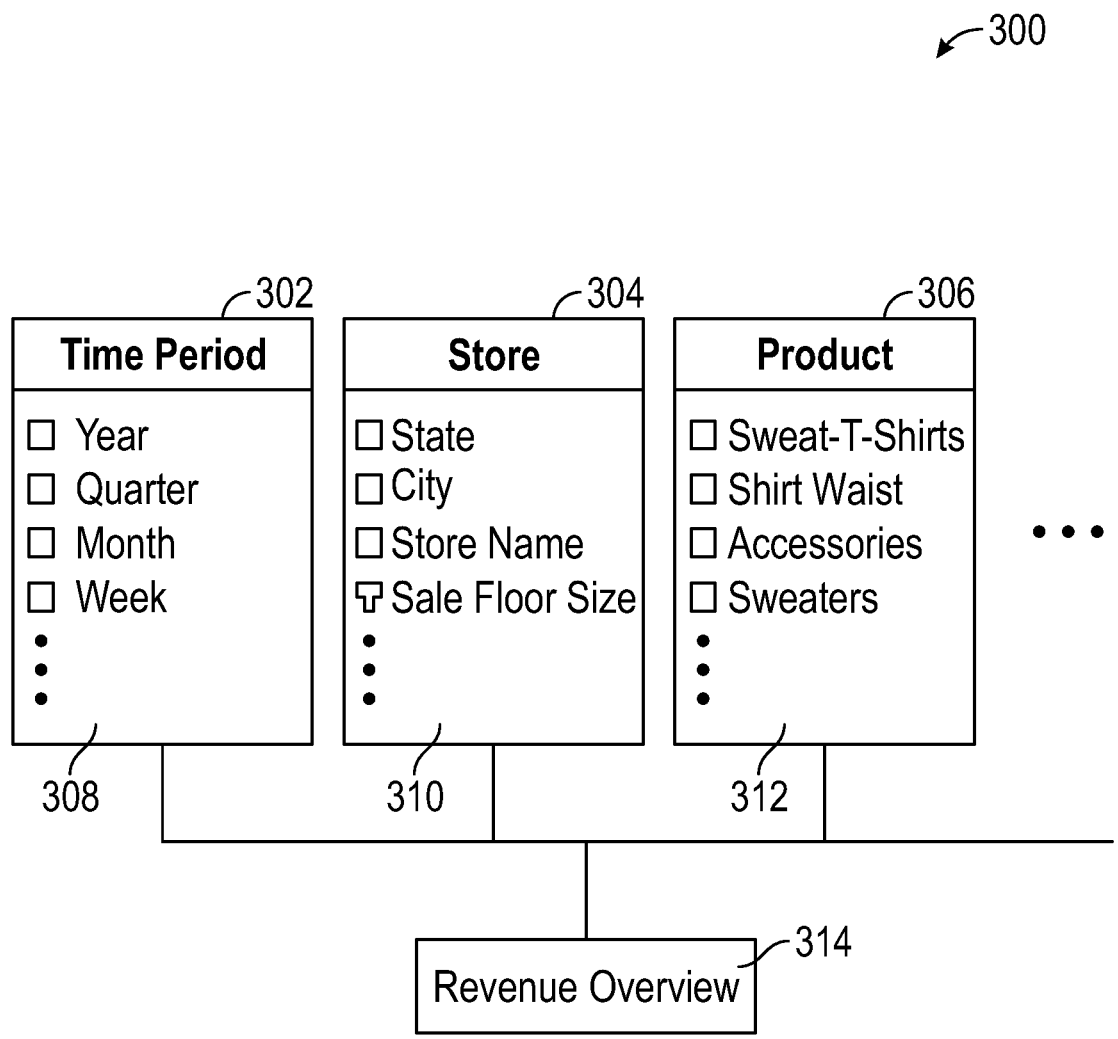
FIG. 3 depicts an exemplary system of a structural identifier comprised of multiple data inputs for certain embodiments.

Turning now to FIG. 3, an exemplary embodiment of a system for creating an analytics report from one or more data inputs is depicted and referred to generally by reference numeral 300. System 300 may be used for generating the analytics reports that can be used to populate analytics rendering 10, and which further comprise the structural identifiers as described above. As depicted in FIG. 3, a plurality of data inputs, or objects as they can sometimes be referred to, may be selected by a user for building an analytics report. For example, exemplary embodiments of data inputs are depicted by reference numerals 302, 304, and 306 respectively and an exemplary embodiment of an analytics report is depicted by reference numeral 314. It will be appreciated that while the depicted system in FIG. 3 depicts report 314 constructed from three data inputs, report 314 may be constructed from any number of data inputs, including more or less than three data inputs. In the exemplary embodiment, each of the data inputs may be associated with the report calculation of report 314. For example, FIG. 3 depicts an exemplary embodiment in which report 314 may be constructed from a plurality of data inputs. Data input 302 illustrates an exemplary embodiment of a data input directed to an exemplary time period. Data input 304 illustrates an exemplary embodiment of a data input direct to an exemplary store. Data input 306 illustrates an exemplary embodiment of a data input directed to exemplary products. As further depicted in FIG. 3, the exemplary data inputs may be used to generate an analytics report, such as exemplary report 314 as illustrated in FIG. 3. In some embodiments and as further illustrated in FIG. 3, the data inputs may comprise hierarchical data that can be expanded or contracted, comprising sub-sets of data, allowing for custom and potentially ever changing and evolving reports. After selection of the chosen data inputs, an analytics report may be generated based on the selected objects and data inputs.

In some embodiments, the data inputs may be located in databases, data storage servers, or other systems that have a certain level of trust associated with the source of the data. In some embodiments, certain data sources may be a trusted source, or may otherwise have a degree of accuracy, integrity, or trust that is known to the user. For example, first-party data that is stored on a server or database owned or operated by a user or the user's organization may have certain security measures in place that the user is aware of. In some embodiments, such trusted data sources may further comprise metadata or a visual representation that the data is from a trusted source. In some embodiments, the metadata or visual representation associated with data from a trusted source may be incorporated into the visual indicator applied to the structural identifier.

Figure 4A:
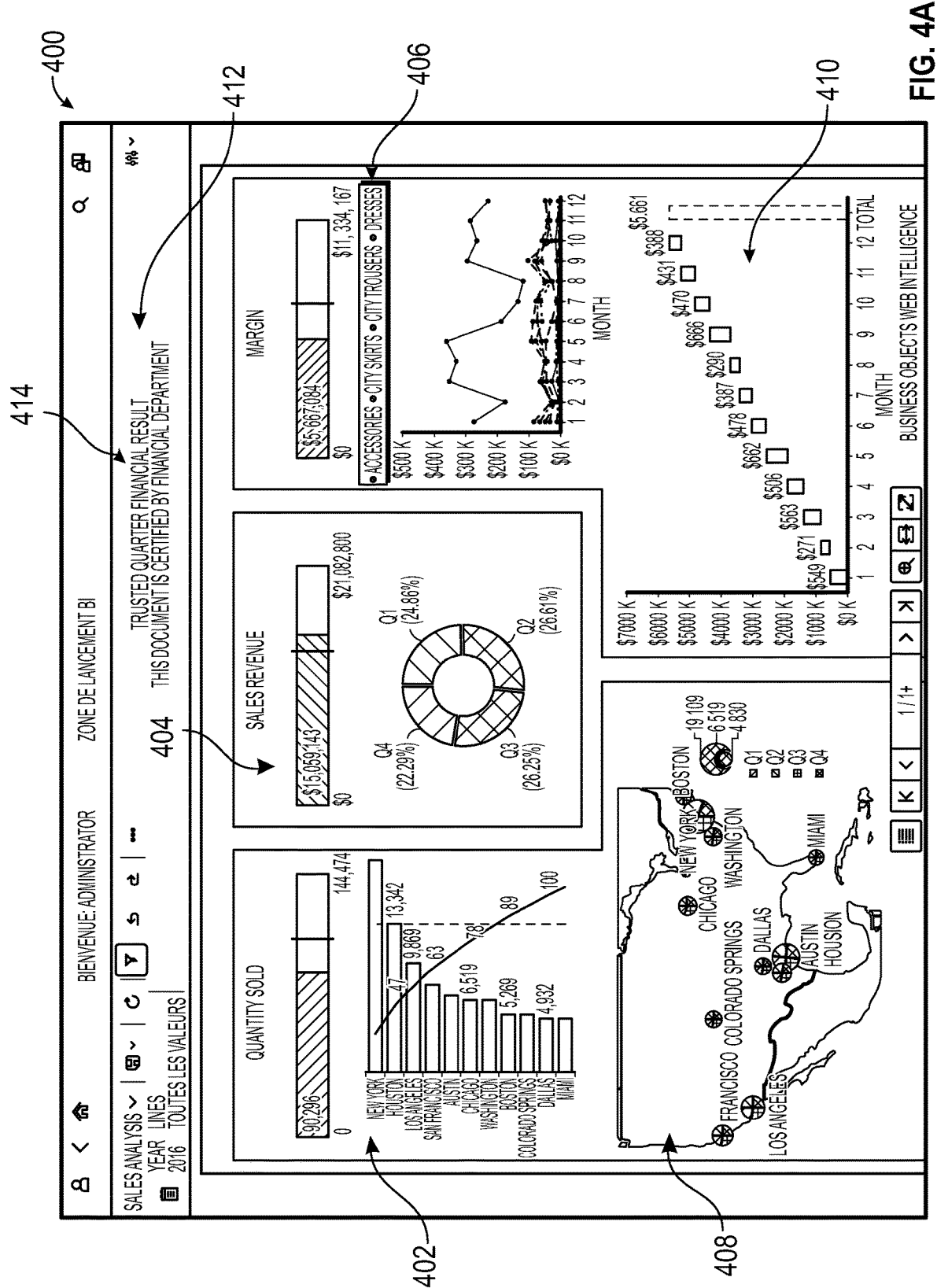
FIG. 4A depicts an exemplary run-time of an analytics rendering with a visual indicator of authenticity applied for certain embodiments.

Turning now to FIG. 4A, an exemplary embodiment of a user interface depicting the run time of analytics rendering 10 is depicted and referred to generally by reference number 400. User interface 400 depicts an exemplary embodiment of the run time of analytics rendering 10 comprising a plurality of rendered analytics reports depicted and referred by reference numerals 402, 404, 406, 408, and 410, respectively. Report 402 illustrates an exemplary analytics report for the quantity of widgets sold, depicted by an exemplary embodiment of an analytics rendering component rendered as a first graph denoting the total quantity of widgets sold and a second graph denoted the quantity of widgets sold by a plurality of geographical locations. Report 404 illustrates an exemplary analytics report for the sales revenue of widgets sold denoted by an exemplary embodiment of an analytics rendering component rendered as a first graph illustrating the total sales revenue and a second graph illustrating the percentage of revenue by quarter. Report 406 illustrates an exemplary analytics report of a sales margin of the widgets sold during a reporting period denoted by an exemplary embodiment of an analytics rendering component rendered as a bar graph and a line-graph denoting sale by type of widget. Report 408 illustrates an exemplary analytics report for the geographical location of widgets sold denoted by an exemplary embodiment of an analytics rendering component rendered as a map. Report 410 illustrates an exemplary analytics report of sales denoted by an exemplary embodiment of an analytics rendering component rendered as a bar graph denoting sales of widgets per month over a calendar year. In some embodiments, reports 402, 404, 406, 408, and 410 may be created in the manner described above, constructed by a plurality of data inputs that are selected to create an analytics report, as known in the art of analytics and business intelligence documents. Alternatively, in some embodiments, analytics rendering 10 displayed in user interface 400 may comprise more or fewer analytics reports, or the analytic reports may comprise varying analytics rendering components other than the analytics rendering components illustrated in FIG. 4A.

As further depicted in FIG. 4A, user interface 400 may further comprise at least one visual indicator 412 that is rendered and displayed in user interface 400. Visual indicator 412 may be positioned at any location on analytics rendering 10, including the run time, design time, or both of analytics rendering 10. In some embodiments, the at least one visual indicator applied to the structural identifiers of analytics rendering 10 may not be visible to all users viewing analytics rendering 10. For example, some end-users may only have access or credentials to view the run time of the analytics rendering 10 and will not have the credentials or access to view the design time of analytics rendering 10. However, in some embodiments, it may still be desirable for an end-user or other users to know whether analytics rendering 10 has been reviewed and comprises authentic, accurate, valid, and/or trustworthy data or information. Therefore, in some embodiments, analytics rendering 10 may further comprise at least one visual indicator 412 rendered in user interface 400 and visible to an end-user viewing analytics rendering 410. In some embodiments, visual indicator 412 may be connected or associated with at least one of the structural identifiers of analytics rendering 10, while being rendered in the run time of user interface 400. In some embodiments, visual indicator 412 may be an infographic, textbox, or other graphic that comprises descriptive information to the end-user as to whether the analytics rendering is authentic, or the overall integrity of analytics rendering is valid. In some embodiments, visual indicator 412 may further comprise descriptive information 414 providing information about the user, department, group, or administrator responsible for applying the visual indicator to the structural identifier on the design time of document 10. In some embodiments, descriptive information 414 may further comprise metadata associated with the signing user or may further or additionally comprise a time stamp of when visual indicator 412 was applied. Alternatively, in some embodiments visual indicator 412 may comprise a binary indication of whether analytics rendering 10 has been reviewed by a user with approved credentials and the contents within analytics rendering 10 is accurate and trusted.

One advantage of analytic reports and the resulting analytics rendering, is that analytic reports are frequently or constantly being updated with new information, oftentimes in real-time. Analytics rendering oftentimes feature a refresh command, or alternatively are automatically refreshed, such that the underlying data inputs comprising the analytics reports are updated with new data and information.

Figure 4B:
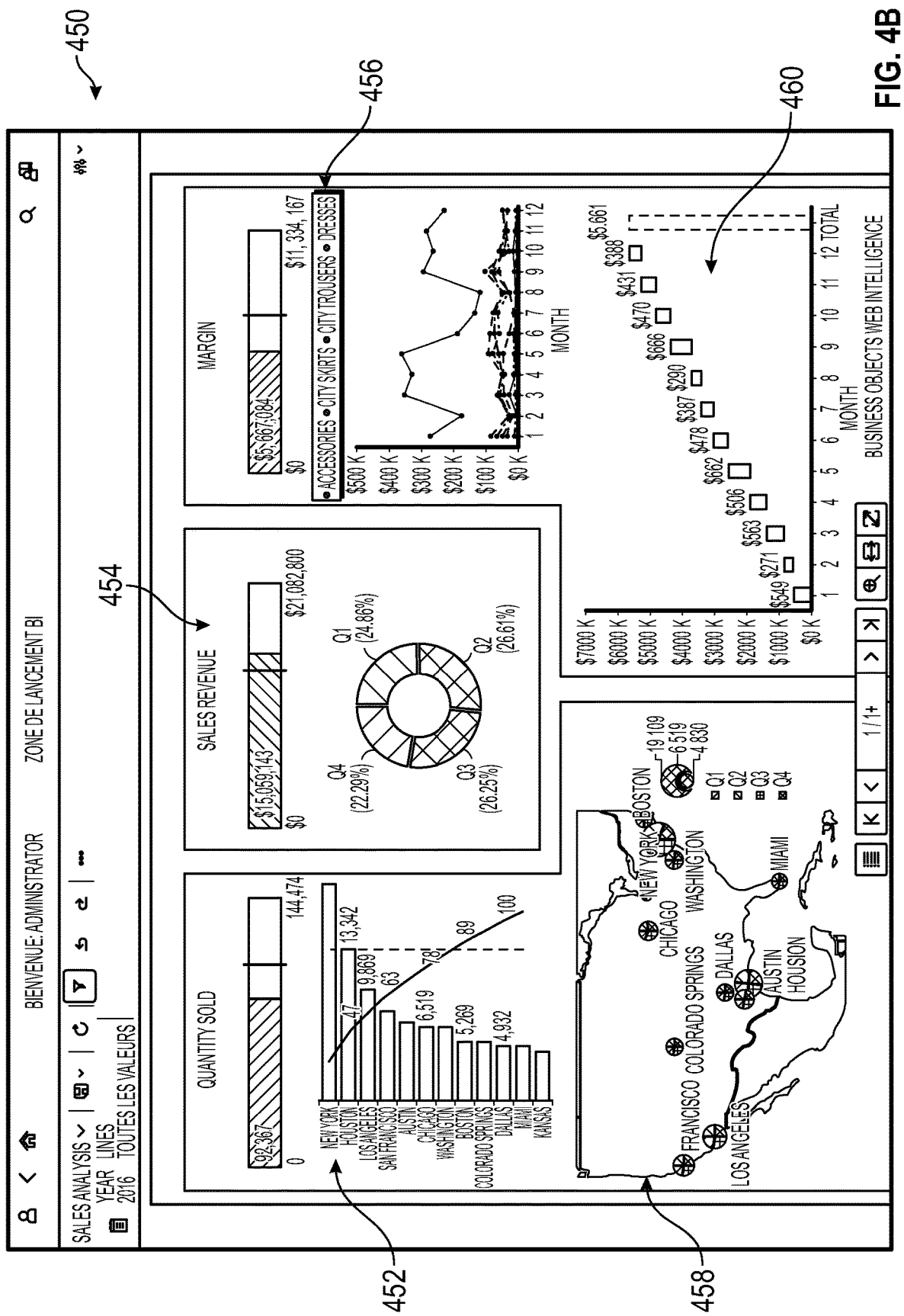
FIG. 4B depicts the exemplary run-time of the analytics rendering of FIG. 4A with a broken visual indicator of authenticity.

Turning now to FIG. 4B, in some embodiments, user interface 450 may display analytics rendering 10 after alterations or modifications have been made to one or more of the analytics reports corresponding data inputs that a visual indicator has been applied to. In the exemplary embodiment depicted in FIG. 4B, analytics reports are depicted and referred to by reference numerals 452, 454, 456, 458, and 460 respectively. With reference to FIG. 4A, report 452 corresponds to report 402, report 454 corresponds to report 404, report 456 corresponds to report 406, report 458 corresponds to report 408, and report 460 corresponds to report 410.

As further depicted in FIG. 4B, in some embodiments, certain alterations or modifications made to analytics rendering 10 may alter, or even remove visual indicator 412. For example, in comparing report 452 to its corresponding report 402 in FIG. 4A, a modification has been made to report 452. In this exemplary embodiment, a visual indicator has been applied to the data inputs at the design time of report 402. An additional data input has been added to report 452 by a user, creating a new data input and affecting the calculation of report 452. Specifically, a data input for "Kansas" to report 452 reflecting an additional geographic location reporting the location and quantities of widgets sold as reported in report 452, increasing the number of widgets sold from 90,296 in report 402 to 92,367 in report 452. In this exemplary embodiment, because a visual indicator was applied to the data inputs of report 402, the addition of a new data input altered report 402 then merely refreshing the data sources of the previously incorporated data inputs. This alteration further caused the removal of visual indicator 412, alerting the user that at least one data input of analytics rendering 10 has been altered since visual indicator 412 was applied. In some embodiments, rather than removing visual indicator 412 after such an alteration, a graphic or text notification may instead be displayed in user interface 450, alerting the user that an alteration or modification of at least one data input of analytics rendering 10 has occurred. Further, in some embodiments not all reports or contents of analytics rendering 10 will comprise visual indicators applied to the data inputs of the analytics reports. In these types of exemplary embodiments, if the data inputs of an analytics report of analytics rendering 10 is altered or modified by a user, visual indicator 412 will not be removed or altered, because no data input comprising a visual indicator has been altered or modified.

Figure 5:
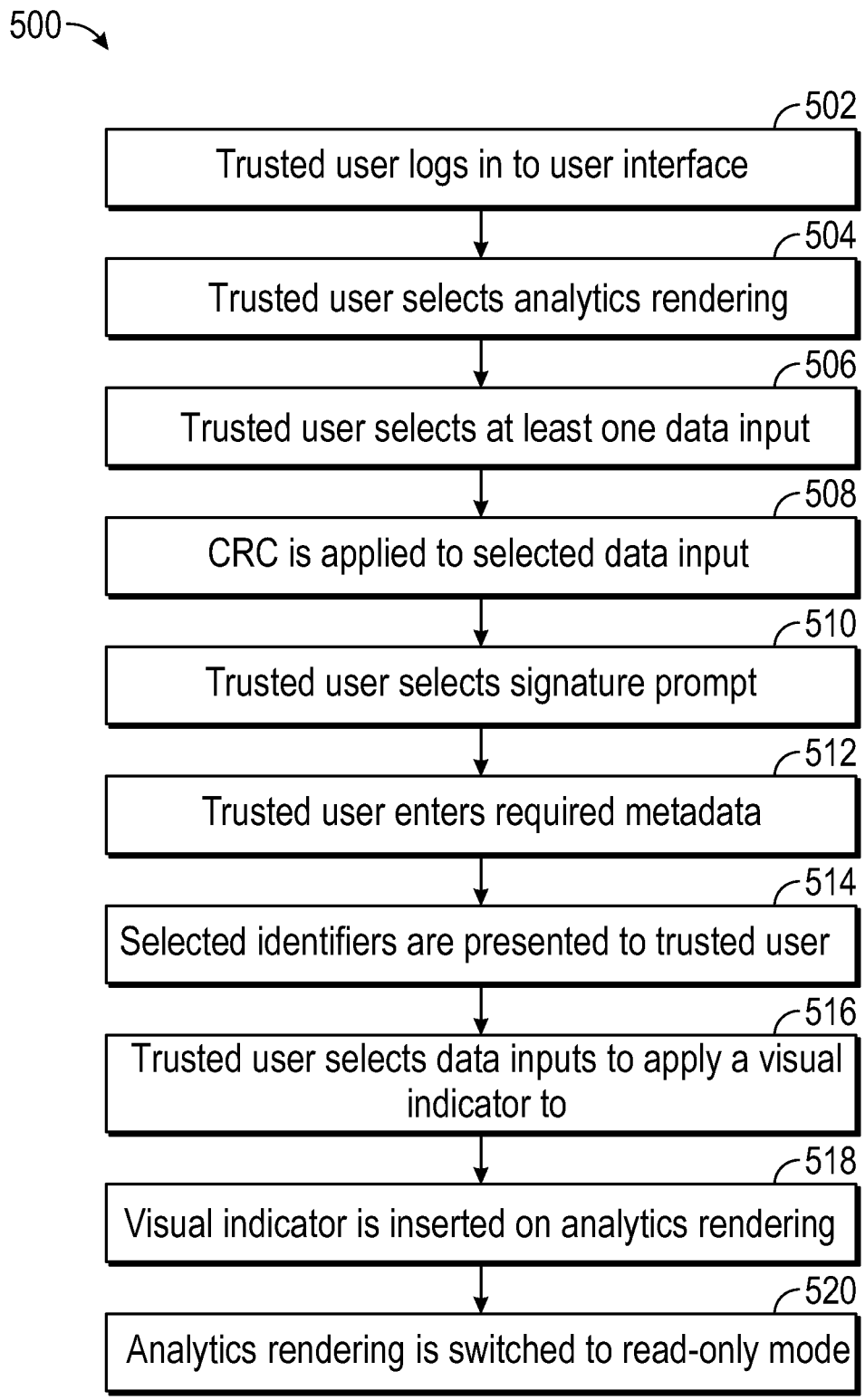
FIG. 5 depicts an exemplary flowchart illustrating a method of applying a visual indicator to an analytics rendering.

Turning now to FIG. 5, an exemplary flowchart illustrating the operation of a method in accordance with certain embodiments is depicted and referred to generally by reference numeral 500. The embodiments described in connection with FIG. 5 are directed to applying a visual indicator of authenticity to an analytics rendering. Initially, at step 502, a trusted user logs in to the user interface of an analytics rendering, for example the exemplary embodiment of analytics rendering described in FIGS. 1 and 2 herein. In the exemplary embodiment of the analytics rendering, the analytics rendering may be designed as having a design time comprising the skeleton and structural identifiers of the data inputs of the analytics reports comprising the analytics rendering. The analytics reports may further be rendered and displayed in the user interface in the run time and comprising at least one analytics rendering components, which may be rendered as charts, graphs, tables, and other infographics of the analytics rendering. In some embodiments, the analytics rendering may be created in accordance with the method described above, in which a user creates an analytics rendering through the selection of analytics reports generated through the selection of a plurality of data inputs, wherein the data inputs may further comprise a plurality of data subsets in a hierarchal structure that are commonly known in analytics and business intelligence documents. The plurality of data inputs may further comprise structural identifiers, providing the trusted user with structural information associated with each of the plurality of data inputs.

In some embodiments, a trusted user may log in to the user interface using pre-approved, or otherwise credentialed log-in information. The trusted user's log-in information may be provided at an administrative level, or otherwise provided in a manner to ensure that only a few, pre-approved users are able to access the design time interface of the analytics rendering. To phrase another way, an end-user lacking authorization or pre-approved credentials will not be able to access the design-time of analytics rendering 10 or apply a visual indicator to analytics rendering 10. By requiring a certain level of approval or credentials, an additional level of security provides the session with an increased level of trust, thereby adding to the integrity of authenticating the analytics rendering.

Next, at step 504, a trusted user that has been pre-approved, or otherwise has the credentials to modify an analytics rendering or otherwise access the design time of analytics rendering 10 may select a specific analytics rendering. For example, oftentimes programs, dedicated software, or clients store multiple analytics renderings associated with an organization or group, and the trusted user may only have credentials to access a portion of the total stored analytics renderings, or for a particular session only one analytics rendering is relevant. In some embodiments, a user will select only one analytics rendering to review and apply a visual indicator to. In exemplary embodiments, the user may be able to select a plurality of analytics renderings to review in batches. In some embodiments, the analytics rendering chosen by the trusted user will comprise the analytics reports, analytics rendering components, the plurality of data inputs and the structural identifiers as described herein.

In some embodiments, at step 506, a trusted user may then select at least one of the data inputs comprising at least one structural identifier of at least one of the analytics reports comprising the analytics rendering. As described above, a structural identifier may be associated with and provide information associated with at least one of the plurality of data inputs, and comprise the formula, data, or structural components of the skeleton of the analytics rendering. The plurality of data inputs may further comprise data that may evolve or otherwise update over time, to reflect real time or up-to-date information for each analytics report, and accordingly, for the analytics rendering as a whole.

At a next step 508, a cyclic redundancy check ("CRC") may be applied to selected identifiers of the data inputs for extracting unique identifying information of the data inputs and/or for checking for errors in the data. For example, the CRC may be applied on the selected identifiers and extract information related to: a user ID of a publisher; the location of the analytics rendering (e.g., folder, to avoid location changes); data source origins; business objects involved; the structural view of the analytics rendering (e.g., tables, charts, graphs, infographics, layout, etc.); enrichment involved (e.g., merger of the data inputs, transformation, condition, etc.); calculation of formula (e.g. sum, average, median, standard deviation, etc.) formatting (e.g. conditional formatting; and hard coded values, for example. In some embodiments, the CRC can be applied to one selected identifier, or alternatively, in some embodiments the CRC can be applied to a plurality of selected identifiers of the data inputs. The CRC may provide confirmation to the trusted user that the data inputs are error-free and contain accurate data and information. Alternatively, the CRC may provide information to the trusted user that the data inputs contain one or more errors, alerting the trusted user to take appropriate measures to correct any defects.

Next, at step 510, the trusted user may be provided with a signature prompt, in which the details of the visual indicator that will be applied to the analytics rendering may be entered. For example, in some embodiments, the signature prompt may require the trusted user to enter identifying information about the trusted user, such as for example the trusted user's title, department, administrative level, clearance, or other relevant identifying information. The trusted user may enter in a predetermined level of descriptive information that can aid users at a later time, or that can aid in ensuring the authenticity and integrity of both the visual indicator as well as the analytics rendering as a whole.

Next, at step 512, the trusted user can then enter required metadata that can be applied to the visual indicator. For example, the required metadata may be information associated with the trusted user. For example, in some embodiments the metadata may comprise information directed to the credentials of the trusted user or the organizational credentials of the group or organization that the trusted user belongs to. The metadata may further comprise a timestamp or other analytical information associated with the trusted user. In embodiments, the metadata may be associated with the visual indicator and can be viewed by another user or administrator after the visual indicator has been applied to the analytics rendering. This can aid in providing identifying information of what users have reviewed the analytics rendering, which users have applied the visual indicator, and information directed to the validity, accuracy, or authenticity of the analytics rendering. This can further aid in troubleshooting potential problems as they arise in the future, as well as maintaining a clear line of title as the analytics rendering undergoes future revisions, updates, or changes.

In some embodiments, one or more digital signatures are applied to metadata regarding the authenticity of particular data inputs. In these examples, the data inputs may correspond to secure web application programming interface (API) endpoints or other secure definitions of data sources such that verifying a digital signature of the corresponding data input description can provide a validation of the authenticity of the data coming from the trusted data sources. In these embodiments, dynamic analytics information is obtained based on the signed trusted inputs.

Next, at step 514, selected identifiers of the data inputs can be presented to the trusted user, such that the trusted user can select a "depth" at which the visual indicator will be applied to. By way of non-limiting example, and as described above, the data inputs and/or associated structural identifiers may comprise a hierarchal design or otherwise comprise sub-sets of data. The trusted user can choose whether the visual indicator will be associated with specific sub-sets of the data within the analytics report or whether to visual indicator will be associated with all data inputs of a selected analytics report. This selective application of the visual indicator can aid with granularity of the analytics rendering and for alterations and modifications that can be made to the analytics rendering that will not alter or break the visual indicator.

At step 516, and based on the analysis of step 514, the trusted user may then choose which of the data inputs and/or structural identifiers the visual indicator will be applied to. In some embodiments, the trusted user may select a dialog box and manually enter the selected data inputs and/or structural identifiers. In some embodiments, the trusted user may click or designate the data inputs and/or structural identifiers the visual indicator will be applied to. In some embodiments, the selective choosing of data inputs and/or selected identifiers that the visual indicator is applied to provides a "depth" to the visual indicator. For example, by selectively choosing the depth that the visual indicator is applied to, the trusted user can "lock" portions of the analytics rendering through the selection of the data inputs and/or selected identifiers. For example, after a visual indicator has been applied to at least one data input or structural identifier of an analytics report, if a modification is later made that affects the chosen data input or analytics report, such as for example deletion of the data input from the analytics report, the visual indicator may break or alter in a way that alerts a user that the analytics rendering is no longer authentic.

Next at step 518, after selecting at least one data input and/or structural identifier the visual indicator is then inserted into the analytics rendering and applied to the at least one data input and/or structural identifier. In some embodiments, the visual indicator can be applied at the design time and is rendered in the user interface of the analytics rendering. In some embodiments, the visual indicator can be applied at the run time and can be rendered in the user interface of the analytics rendering. In some embodiments, the visual indicator is applied at both the run time and the design time and rendered in the user interface of the analytics rendering. In some embodiments, the visual indicator can comprise descriptive information about the trusted user. In some embodiments, the visual indicator can comprise metadata associated with the trusted user that applied the visual indicator.

Next, at step 520, the analytics rendering can be switched to a read-only mode based at least on part on the selected data inputs and/or structural identifiers applied with the visual indicator. For example, after switching to a read-only mode, the analytics rendering may continue to be modified by the trusted user, or alternatively, by another user. Modifications may be made to the analytics rendering, such as refreshing the data sources, modifying the visual representations of the analytics rendering, such as for example the charts, graphs, infographics, tables, or other graphics, or modifying the layout of the analytics rendering without affecting or breaking the visual indicator applied to the structural identifiers.

In some embodiments, the above-described method may be repeated and applied to multiple data inputs and/or structural identifiers. For example, in some embodiments the analytics rendering may comprise a plurality of analytics reports comprising data inputs and structural identifiers associated with each analytics report.

Figure 6:
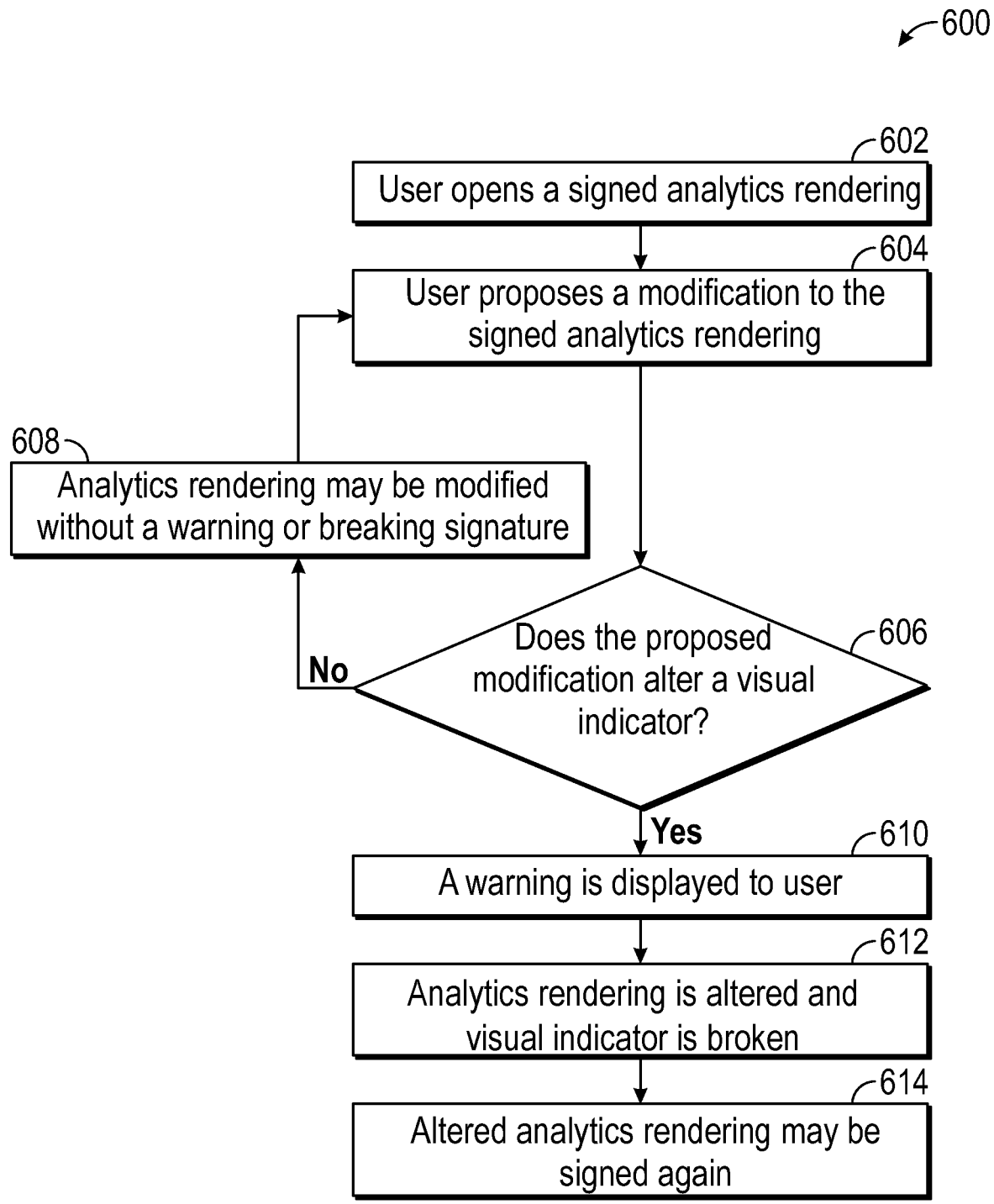
FIG. 6 depicts an exemplary flowchart illustrating a method of applying a visual indicator to an analytics rendering.

Turning now to FIG. 6, an exemplary flowchart illustrating the operation of modifying an analytics rendering already comprising a visual indicator in accordance with certain embodiments is depicted and referred to generally by reference numeral 600. Initially, at step 602, a user can open an analytics rendering comprising a previously applied visual indicator applied to at least one data input and/or structural identifier of the analytics rendering. In some embodiments, the visual indicator can be applied in the above-described method. In some embodiments, the user may be a trusted user with pre-approved credentials that has been authorized to modify the analytics rendering. In some embodiments, only a trusted user having pre-approved credentials may make modifications to an already signed analytics rendering comprising a visual indicator. Alternatively, in some embodiments, a user that does not have pre-approved credentials may nonetheless modify an analytics rendering comprising a visual indicator. In some exemplary embodiments, if a user that does not have pre-approved credentials opens an analytics rendering, a warning or notification may be rendered and displayed to the user alerting the user that they are not authorized to modify the analytics rendering. In some exemplary embodiments, a user that does not have pre-approved credentials is unable to modify or alter analytics rendering comprising a visual indicator.

Next, at step 604, the user may propose a modification to the analytics rendering comprising the visual indicator. In some embodiments, the user must enter a command into the user interface describing the proposed modification to the analytics rendering. In some embodiments, the user could enter the command or action and attempt to execute the command or action. It will be appreciated that the proposed modification can be proposed in any known manner of entering program-executable commands and is not intended to be a limiting feature.

Next, at test 606, a determination of whether the proposed modification will alter the visual indicator can be made. For example, if the proposed modification modifies a portion of the analytics rendering that the visual indicator is not applied to, such as for example resizing a table or chart in the analytics rendering or refreshing the data source, then the determination can be made that the proposed modification will not alter the visual indicator. Alternatively, if the proposed modification modifies a portion of the analytics rendering that the visual indicator is applied to, such as for example adding an additional data input to an analytics report that the visual indicator is applied to, and accordingly modifying the analytics report, then the determination can be made that the proposed modification will alter the visual indicator.

At step 608, if the determination made at test 606 determines that the proposed modification would not alter the visual indicator, then the proposed modification may be made without providing a warning to the user. Additionally, if the proposed modification would not alter the visual indicator, then the proposed modification may be applied to the analytics rendering without breaking or altering the visual indicator. Following the application of the proposed modification to the analytics rendering that does not break or alter the visual indicator, the user may go back to step 604 and propose an additional proposed modification to the analytics rendering. Alternatively, if the user has completed all modifications to the analytics rendering for the current session, the analytics rendering may be closed out.

At step 610, if the determination made at test 606 determines that the proposed modification would alter or break the visual indicator, a warning can be displayed in the user interface of the analytics rendering to the user. In some embodiments, the warning may be in the form of a text-based description, alerting the user that the proposed modification would alter or break the visual indicator. In some embodiments, the warning may be a graphic, alerting the user that the proposed modification would alter or break the visual indicator. In some embodiments, the warning may further comprise an affirmative acknowledgment, requiring an input command by the user that the user has been made aware that the proposed modification will alter or break the visual indicator.

At step 612, after the warning has been displayed and acknowledged by the user, the proposed modification may be applied to the analytics rendering and the analytics rendering may be altered in accordance with the proposed modification. Accordingly, after the proposed modification has been applied to the analytics rendering, the visual indicator may be altered or broken. For example, in some embodiments, after the analytics rendering has been modified, the visual indicator may be removed from the user interface, displaying to the user that the integrity of the analytics rendering has been altered. In some embodiments, after the analytics rendering has been modified, the visual indicator may be visually altered, displaying to the user that the integrity of the analytics rendering has been modified. For example, in some embodiments, text or a graphic may be applied to the visual indicator after the visual indicator has been broken. The text or graphic may comprise descriptive information to alert the user about the specific nature of the cause of the breaking of the visual indicator. Additionally, the text or graphic may further comprise metadata associated with the modification that caused the visual indicator to be altered or broken, and for example may be a time stamp or metadata associated with the user that caused the visual indicator to be altered.

At step 614, after the proposed modification has been applied and the visual indicator has been broken or removed, the user may continue to make modifications to the analytics rendering. In some embodiments, the analytics rendering may comprise multiple visual indicators applied to a plurality of data inputs and/or structural identifiers of a plurality of analytics reports. If a proposed modification would alter or break an additional visual indicator, then test 606 may be applied again, with the resulting steps in the process are repeated. At the end of the session and after all proposed modifications have been made to the analytics rendering, the analytics rendering can then undergo the process for adding a visual indicator in the manner that is described above.

Figure 7:
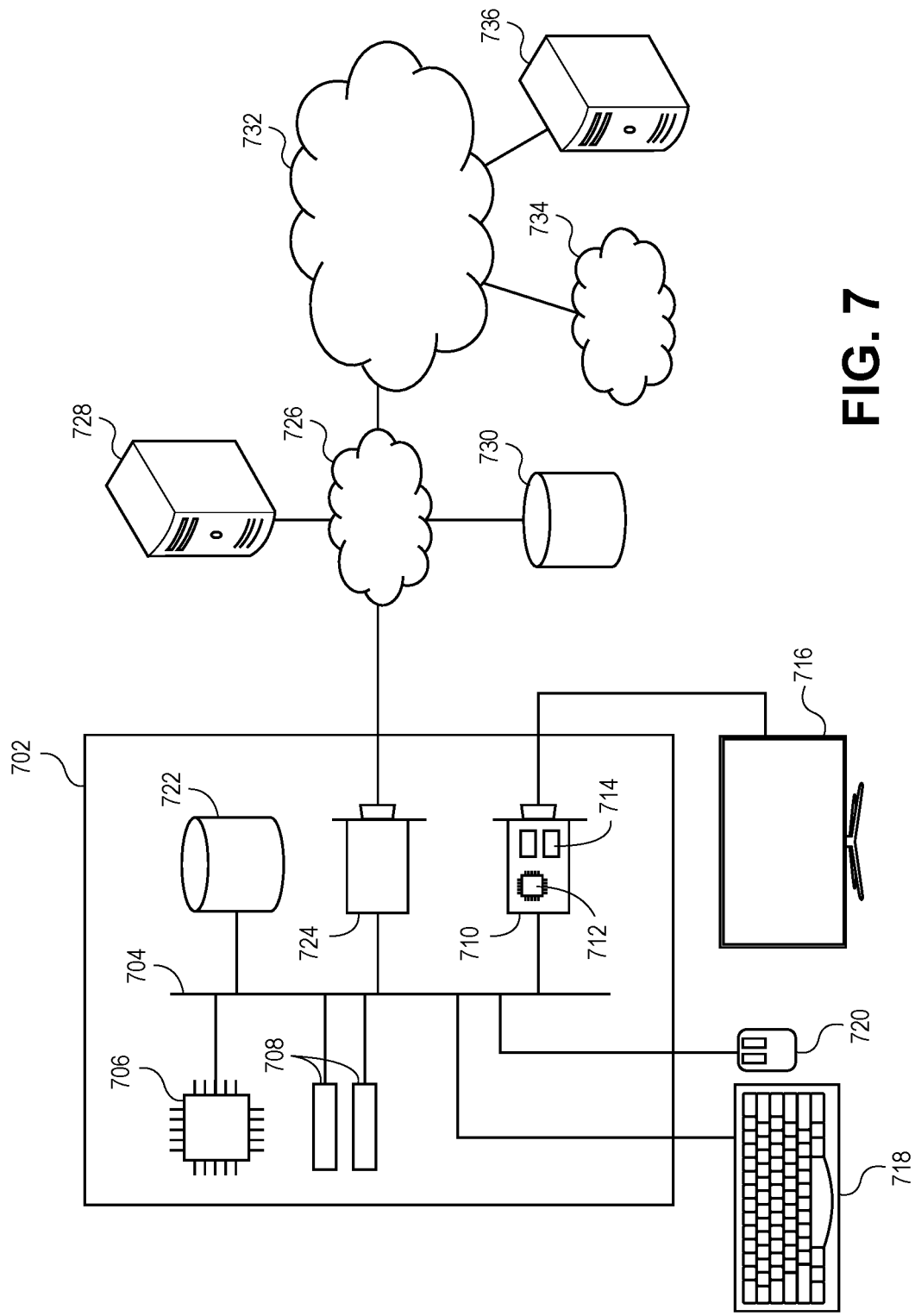
FIG. 7 depicts an exemplary hardware platform for certain embodiments.

FIG. 7 illustrates an exemplary computer hardware system 700, that may cooperate with analytics rendering. Computing device 702 can be a desktop computer, a laptop computer, a server computer, a mobile device such as a smartphone or tablet, or any other form factor of general- or special-purpose computing device. Depicted with computing device 702 are several components, for illustrative purposes. In some embodiments, certain components may be arranged differently or absent. Additional components may also be present. Included in computing device 702 is system bus 704, whereby other components of computing device 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708.

Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is computer display 716 for user interaction. In some embodiments no display is present, while in others it is integrated into computing device 702. Similarly, peripherals such as keyboard 718 and mouse 720 are connected to system bus 704. Like computer display 716, these peripherals may be integrated into computing device 702 or absent. Also connected to system bus 704 is local storage 722, which may be any form of computer-readable media and may be internally installed in computing device 702 or externally and removably attached.

Finally, network interface card (NIC) 724 is also attached to system bus 704 and allows computing device 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computing device 702 to local network 726, which may also include one or more other computers, such as computer 728, and network storage, such as data store 730. Local network 726 is in turn connected to Internet 732, which connects many networks such as local network 726, remote network 734 or directly attached computers such as computer 736. In some embodiments, computing device 702 can itself be directly connected to Internet 732.

Various computer programs representative of certain embodiments comprise a plurality of code segments executable by a computing device for performing the steps of various disclosed methods. The steps of the methods may be performed in the order discussed, or they may be performed in a different order, unless otherwise expressly stated. Furthermore, some steps may be performed concurrently as opposed to sequentially. Also, some steps may be optional. The computer programs may also execute additional steps not described herein. The computer programs, systems, and methods of embodiments may be implemented in hardware, software, firmware, or combinations thereof, which broadly comprises server devices, computing devices, and a communications network.

Computer programs consistent with the present teachings may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The monitor, server devices, and computing devices 702 may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), workstations, desktop computers, laptop computers, palmtop computers, tablet computers, portable digital assistants (PDA), smartphones, and the like, or combinations thereof. Various embodiments of the computing device may also include voice communication devices, such as cell phones and/or smartphones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the monitor.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

Computer programs consistent with the present teachings may be implemented on user computing devices or, alternatively, may run on one or more server devices. In certain embodiments, exemplary computer programs may be embodied by way of a stand-alone computer program (i.e., an "app") downloaded on a user's computing device or in a web-accessible program that is accessible by the user's computing device via the communications network. As used herein, the stand-alone computer program or web-accessible program provides users with access to an electronic resource from which the users can interact with various embodiments.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and sub-combinations and are contemplated within the scope of the claims. Although various embodiments have been described with reference to the embodiments illustrated in the attached drawing figures, it is noted that equivalents may be employed, and substitutions made herein without departing from the scope of the recited claims.

Having thus described various embodiments, what is claimed as new and desired to be protected by Letters Patent includes the following:

The invention claimed is:

1. One or more non-transitory computer-readable media storing computer-executable instructions that, when executed by a processor, perform a method for applying a digital signature to an analytics rendering providing a visual indication that the analytics rendering is valid, the method comprising:
retrieving, based upon a selection by a trusted user, an analytics report comprising at least one analytics rendering component rendered from a plurality of aggregated data inputs from a plurality of data sources, wherein the trusted user has credentials or authorization to access a user interface displaying a design-time of the analytics rendering;
displaying, in the user interface for the analytics report, a plurality of structural identifiers associated with each data input of the plurality of aggregated data inputs;
retrieving, based upon a selection by a user, one or more data inputs from the plurality of aggregated data inputs;
responsive to receiving an instruction from a user, performing a cyclic redundancy check on the plurality of structural identifiers of a selected data input;
based on a result of the cyclic redundancy check on the plurality of structural identifiers, applying a visual indicator to the selected data inputs, wherein the visual indicator provides a visual confirmation of an authenticity of the selected data inputs, the visual indicator displaying at least a name or identity of the trusted user; and
displaying the visual indicator to the user in the user interface, wherein the visual confirmation of the authenticity of the selected data inputs is based on a digital signature applied to metadata associated with the one or more data inputs.

2. The non-transitory computer readable media of claim 1, wherein the visual indicator is based on validation of the digital signature.

3. The non-transitory computer readable media of claim 2, wherein the digital signature further comprises metadata associated with the user responsible for the digital signature.

4. The non-transitory computer readable media of claim 3 further comprising the steps of:
receiving credentials of the user; and
determining whether the user is a trusted user with authorization to modify data sources associated with the analytics rendering.

5. The non-transitory computer readable media of claim 4, wherein the visual indicator further comprises additional description information about the trusted user responsible for applying the signature.

6. The non-transitory computer readable media of claim 5, wherein the visual indicator is not applied to the selected data input if a request to apply the visual indicator is received from a non-trusted user.

7. The non-transitory computer readable media of claim 1, wherein the visual indicator can be applied to each of the data inputs of the plurality of aggregated data inputs.

8. A method for authenticating contents of an analytics rendering, the method comprising:
- displaying in a user interface, an analytics rendering comprising at least one analytics rendering component rendered from a plurality of aggregated data inputs from at least one source, the analytics rendering further comprising a run time and a design time,
  - wherein each data input of the plurality of aggregated data inputs comprises at least one structural identifier,
  - wherein the at least one structural identifier is visible to a trusted user at either of the run time, design time, or both of the analytics rendering, wherein the trusted user has credentials or authorization to access the user interface displaying a design-time of the analytics rendering;
- responsive to receiving an instruction from the user, performing a cyclic redundancy check on the plurality of structural identifiers of a selected data input;
- based on a result of the cyclic redundancy check on the plurality of structural identifiers, applying a visual indicator to the selected data input, wherein the visual indicator provides a visual confirmation of an authenticity of the selected data input; and
- displaying the visual indicator to the user in the user interface, wherein the visual confirmation of the authenticity of the selected data inputs is based on a digital signature applied to metadata associated with the selected data inputs, the visual indicator displaying at least a name or identity of the trusted user.

9. The method of claim 8, wherein the visual indicator is based on validation of the digital signature.

10. The method of claim 9, wherein the visual indicator is not visible to an end user viewing the analytics rendering from the run time.

11. The method of claim 8, wherein the visual indicator is applied to the run time of the analytics rendering and is visible to an end user.

12. The method of claim 8, further comprising the steps of:
- reviewing credentials of the user; and
- determining whether the user is a trusted user with authorization to modify the analytics rendering.

13. The method of claim 12, wherein the user is a trusted user who can modify underlying data sources for the analytics rendering while preserving validity of the visual indicator.

14. The method of claim 12, wherein the user is an untrusted user who cannot modify the analytics rendering if a modification to the plurality of aggregated data inputs would invalidate the digital signature.

15. A system comprising at least one processor and at least one non-transitory memory storing computer executable instructions that when executed by the processor cause the system to carry out actions comprising:
- displaying in a user interface, an analytics rendering comprising at least one table, chart, or graphic rendered from a plurality of aggregated data inputs from at least one data source;
- displaying, in a user interface for the analytics rendering, a plurality of structural identifiers associated with each data inputs of the plurality of aggregated data inputs, wherein each of the plurality of structural identifiers comprises a plurality of data subsets;
- retrieving, based upon a selection by a trusted user, one data input from the at least one data source, wherein the trusted user has credentials or authorization to access the user interface displaying a design-time of the analytics rendering;
- responsive to receiving an instruction from a user, performing a cyclic redundancy check on the plurality of structural identifiers of a selected data input;
- based on a result of the cyclic redundancy check on the plurality of structural identifiers, applying a visual indicator to at least one data subset in the structural identifier, wherein the visual indicator provides a visual confirmation of an authenticity of the selected data inputs, the visual indicator displaying at least a name or identity of the trusted user; and
- displaying the visual indicator to the user in the user interface, wherein the visual confirmation of the authenticity of the selected data inputs is based on a digital signature applied to metadata associated with the selected data inputs.

16. The system of claim 15, further comprising the steps of extracting identifying information from the at least one data source.

17. The system of claim 15, wherein structural identifiers from a trusted source further comprise a visual representation that the structural identifier is from a trusted source.

18. The system of claim 15, wherein the analytics rendering is an analytics dashboard.

19. The system of claim 15, wherein the visual indicator further comprises metadata associated with the user applying the visual indicator.

20. The system of claim 15, wherein if a proposed modification to the analytics rendering would result in invalidation of the digital signature, a warning will be displayed to the user alerting the user that the proposed modification will cause the visual indicator to be invalidated.

* * * * *